UNITED STATES PATENT OFFICE.

DMITRY ALEXANDROWITCH PÉNIAKOFF, OF HUY, BELGIUM.

ALUMINIUM SULFID AND PROCESS OF MAKING SAME.

SPECIFICATION forming part of Letters Patent No. 606,576, dated June 28, 1898.

Application filed April 5, 1895. Serial No. 544,658. (No specimens.) Patented in Austria January 28, 1893, No. 43,718; in France April 5, 1893, No. 229,154; in England April 5, 1893, No. 20,604; in Germany May 9, 1893, No. 79,781, and May 19, 1894, No. 80,063; in Belgium October 4, 1893, No. 106,629; in Luxemburg December 12, 1893, No. 1,942; in Italy December 31, 1893, No. 53,001, and in Spain February 9, 1894, No. 15,321.

*To all whom it may concern:*

Be it known that I, DMITRY ALEXANDROWITCH PÉNIAKOFF, a subject of the Emperor of Russia, and a resident of Huy, Belgium, have invented a new and useful Improvement in Aluminium Sulfid and the Process of Making the Same, (for which I have obtained patents in France, No. 229,154, dated April 5, 1893; in Belgium, No. 106,629, dated October 4, 1893; in Italy, No. 53,001, dated December 31, 1893; in Great Britain, No. 20,604, dated April 5, 1893; in Germany, No. 79,781, dated May 9, 1893, and No. 80,063, dated May 19, 1894; in Luxemburg, No. 1,942, dated December 12, 1893; in Spain, No. 15,321, dated February 9, 1894, and in Austria, No. 43,718, dated January 28, 1893,) of which the following is a full, clear, and exact description.

My present invention relates to a process for producing aluminium sulfid and is based on the observation that aluminium sulfid, which hitherto could be obtained only with difficulty even in laboratories, can be produced with comparative ease by treating sulfate of alumina at a temperature below the fusing-point of aluminium sulfid, such as a dull-red heat, with bisulfid of carbon, ($CS_2$,) oxysulfid of carbon, (COS,) or substances from which said sulfids will form under certain conditions. According to the methods now used in laboratories aluminium sulfid is produced by heating alumina for several hours to a white heat in a current of bisulfid of carbon. The result is a black or gray mass molten at the surface. Said mass generally contains in its center a certain amount of unaltered alumina, and for this reason the above method is utterly unsuitable for the production of aluminium sulfid on a commercial scale. There is no doubt that the discovery of a process for cheaply producing aluminium sulfid would correspondingly reduce the cost of producing aluminium itself.

The new process I have invented is simple and cheap, and also has other advantages which will appear from the description following hereinafter.

Instead of the non-porous alumina, which is practically impervious to gases, I employ an eminently-porous body, such as dehydrated sulfate of alumina. The reaction between dehydrated sulfate of alumina and bisulfid of carbon sets in at commencing dull-red heat, a considerable amount of latent heat being set free at the same time, owing to the fact that the carbon combines by combustion, while developing an intense heat with the sulfuric acid, forming carbonic acid, ($CO_2$.) Owing to this heat arising from the reaction itself but little outside heat need be supplied. An advantage of this comparatively low temperature is that the furnace and retorts remain practically intact, while they deteriorate rapidly when exposed to hot vapors of bisulfid of carbon, as in the laboratory process above referred to. The entire amount of sulfur contained in the bisulfid of carbon used is regenerated without additional cost, so that virtually during the whole process carbon only is consumed in order to form bisulfid of carbon. Thus the problem of reducing oxygenated aluminium compounds by means of carbon is solved in a simple and economical manner. The reaction between bisulfid of carbon and sulfate of alumina may be expressed by the following equation:

$$Al_2(SO_4)_3 + 6CS_2 = Al_2S_3 + 6CO_2 + 12S.$$

If oxysulfid of carbon (COS) is used instead of bisulfid of carbon, the result is the same, since 2COS will have the same action as $CO_2 + CS_2$. If I add to the sulfate of alumina the sulfate or another suitable compound of another metal, I obtain instead of aluminium sulfid a double sulfid of aluminium and the other metal used. The process may be carried out on a large scale in the following manner:

Dehydrated sulfate of alumina, either alone or mixed with the sulfate of another metal, is heated to commencing dull-red heat in a suitable retort, flue, or chamber, and then bisulfid or oxysulfid of carbon is passed through the heated mass, these sulfids being either introduced as such or I may employ compounds from which said sulfids will be evolved during the operation. The gases escaping from the retort are conveyed into cooling-chambers in order to save the surplus of bisulfid of carbon and the distilled sulfur.

The final product, which is aluminium sulfid (or a double sulfid of aluminium and another metal, as above explained) and has been obtained at a comparatively low temperature, retains the very porous structure of dehydrated sulfate of alumina, and this is of particular advantage when it is intended to further treat the aluminium sulfid thus obtained with reducing-gases for the purpose of producing metallic aluminium. If, however, it is deemed preferable in view of the subsequent reduction to operate with molten sulfid of aluminium—for instance, when it is intended to effect the reduction by means of a metal—it will be sufficient to heat the porous aluminium sulfid to a bright-red heat.

I am aware that it has been proposed to produce aluminium sulfid from aluminium sulfate by the reaction of carbonbisulfid at a high heat, which may at first appear to be an exact anticipation of my process. In this process there is formed, along with the sulfid of aluminium, either sulfurous acid ($SO_2$) and carbonic oxid (CO) or else oxysulfid of carbon (COS) and sulfurous acid, ($SO_2$,) and a very high temperature is required to give this reaction, which involves large cost for fuel and rapidly destroys the furnace. In my process there is formed, along with the sulfid of aluminium, carbonic acid ($CO_2$) and sulfur, (S,) and the process is conducted at the relatively low temperature of a dull-red heat. I have discovered that this process can be carried out at this low temperature by virtue of the exothermic nature of the reactions—that is to say, to produce $CO_2$ and S sufficient heat is generated by the combustion of the elements themselves to make the reaction exothermic (giving off heat) instead of endothermic, (absorbing heat,) as in the process disclaimed—and hence only a low temperature is required in my process, and the destructive effect of a high temperature on the furnace and other incidental objections are avoided.

Having thus described my invention, I claim as new and desire to secure by Letters Patent—

1. The herein-described process of producing aluminium sulfid or double compounds thereof with other metallic sulfids, which consists in treating heated sulfate of alumina, either alone or mixed with other metallic sulfates, by means of bisulfid of carbon or oxysulfid of carbon, at a temperature below the fusing-point of aluminium sulfid, substantially as described.

2. The herein-described process of producing aluminium sulfid, which consists in treating heated sulfate of alumina with a sulfid of carbon at a temperature below the fusing-point of aluminium sulfid, substantially as described.

3. The herein-described new substance, viz: porous aluminium sulfid, substantially as set forth.

In testimony whereof I have signed my name to this specification in the presence of two subscribing witnesses.

DMITRY ALEXANDROWITCH PÉNIAKOFF.

Witnesses:
EMILE DELAITE,
JULIEN DELAITE.